United States Patent
Cotton et al.

(10) Patent No.: US 8,938,531 B1
(45) Date of Patent: Jan. 20, 2015

(54) APPARATUS, SYSTEM AND METHOD FOR MULTI-CONTEXT EVENT STREAMING NETWORK VULNERABILITY SCANNER

(75) Inventors: Mike Cotton, San Antonio, TX (US); Gordon Mackay, San Antonio, TX (US); Brandon Shilling, San Antonio, TX (US)

(73) Assignee: Digital Defense Incorporated, San Antonio, TX (US)

( * ) Notice: Subject to any disclaimer, the term of this patent is extended or adjusted under 35 U.S.C. 154(b) by 247 days.

(21) Appl. No.: 13/026,668

(22) Filed: Feb. 14, 2011

(51) Int. Cl.
G06F 15/173 (2006.01)
H04L 12/24 (2006.01)
H04L 12/26 (2006.01)
G06F 11/00 (2006.01)
G06F 11/30 (2006.01)
G06F 21/00 (2013.01)

(52) U.S. Cl.
USPC .............. 709/224; 726/22; 726/23; 726/24; 726/25

(58) Field of Classification Search
USPC ................... 709/224; 726/25, 22, 23, 24
See application file for complete search history.

(56) References Cited

U.S. PATENT DOCUMENTS

| | | | |
|---|---|---|---|
| 6,324,656 B1 | 11/2001 | Gleichauf et al. | 714/37 |
| 6,611,869 B1 | 8/2003 | Eschelbeck et al. | 709/228 |
| 6,711,127 B1 | 3/2004 | Gorman et al. | 370/230 |
| 7,325,252 B2 | 1/2008 | Bunker et al. | 726/25 |
| 7,613,625 B2 | 11/2009 | Heinrich | 705/7.28 |
| 8,095,983 B2 * | 1/2012 | Guruswamy | 726/25 |
| 8,127,359 B2 * | 2/2012 | Kelekar | 726/25 |
| 8,135,830 B2 * | 3/2012 | McClure et al. | 709/224 |
| 8,245,298 B2 * | 8/2012 | Pletka et al. | 726/23 |
| 2003/0028803 A1 | 2/2003 | Bunker | 726/4 |
| 2003/0212779 A1 | 11/2003 | Boyter et al. | 709/223 |
| 2004/0088581 A1 * | 5/2004 | Brawn et al. | 713/201 |
| 2004/0103315 A1 | 5/2004 | Cooper et al. | 726/25 |
| 2006/0021048 A1 | 1/2006 | Cook et al. | 726/25 |
| 2006/0021049 A1 | 1/2006 | Cook | 726/25 |
| 2006/0026273 A1 | 2/2006 | Comay et al. | 709/223 |
| 2006/0265746 A1 * | 11/2006 | Farley et al. | 726/22 |
| 2009/0259748 A1 * | 10/2009 | McClure et al. | 709/224 |
| 2009/0316587 A1 * | 12/2009 | Omar | 370/245 |
| 2010/0146099 A1 * | 6/2010 | Lin et al. | 709/224 |
| 2010/0281160 A1 | 11/2010 | Ros-Giralt et al. | 709/224 |
| 2011/0289580 A1 * | 11/2011 | Onuma | 726/12 |
| 2012/0059817 A1 * | 3/2012 | Burger et al. | 707/718 |
| 2012/0260344 A1 * | 10/2012 | Maor et al. | 726/25 |

FOREIGN PATENT DOCUMENTS

| | | |
|---|---|---|
| WO | WO 2004/100011 | 11/2004 |
| WO | WO 2010/042979 | 4/2010 |

* cited by examiner

*Primary Examiner* — Brian J Gillis
*Assistant Examiner* — Juan C Turriate Gastulo
(74) *Attorney, Agent, or Firm* — Fulbright & Jaworski LLP

(57) ABSTRACT

An apparatus, systems, and methods for multi-context event streaming network vulnerability scanners. A method is disclosed for scanning a network by executing a first test program, receiving data from one or more devices on a network in response to the data sent by the first test program, determining one or more context findings from the first test program, and reporting the one or more context findings from the first test program to the scanner engine while the first test program is executing.

21 Claims, 12 Drawing Sheets

Test Ready
Queue
700

| T3 | T4 |  |  |  |  |  |  |
|----|----|--|--|--|--|--|--|
| C1 | C4 |  |  |  |  |  |  |

FIG. 7A

Test Run
List
701

|  |  |  |  |  |  |  |  |
|--|--|--|--|--|--|--|--|

FIG. 7B

Test Context
Launch Table
702

| T1 | T2 |  |  |  |  |  |  |

| C1 | C2 | C3 |  |  |  |  |

| C1 | C2 | C3 |  |  |  |  |

FIG. 7C

Event to Test
Dependency
Table
703

| e1 | → | T1 | T2 | T3 |
| e2 | → | T2 | T5 |    |
| e3 | → | T3 | T5 | T7 |

FIG. 7D

Test to Event
Dependency
Table
704

| T1 | e1*e4 + e6*e7 |
|----|---------------|
| T2 | e1 + e2       |
| T3 | e1 + e3       |

FIG. 7E

Scan Context Level
Event Completion Table
705

| Scan Start | True |
|---|---|
| KEY-a | VAL-a |
| KEY-b | VAL-b |

FIG. 7F

Host Context Level Event
Completion Table
706

| IPa | → | OS | Windows |
|---|---|---|---|
| | | Hostname | Bob |
| | | KEY-c | VAL-c |
| IPb | → | | |
| IPc | → | OS | Linux |
| | | Hostname | Sam |
| | | KEY-c | VAL-c |

FIG. 7G

Service Context Level
Event Completion Table
707

| KEY | → | Protocol | TCP |
|---|---|---|---|
| | | Tunnel | SSL |
| | | KEY-c | VAL-c |
| KEY | | | |
| KEY | → | Protocol | ICMP |
| | | KEY-b | VAL-b |
| | | KEY-c | VAL-c |

FIG. 7H

Application Context Level
Event Completion Table
708

| KEY | → | Vendor | Windows |
|---|---|---|---|
| | | Version | 2002 |
| | | KEY-c | VAL-c |
| KEY | | | |
| KEY | → | KEY-a | VAL-a |
| | | KEY-b | VAL-b |
| | | KEY-c | VAL-c |

FIG. 7I

Vulnerability Context Level
Event Completion Table
709

| KEY | → | Data | binary |
|---|---|---|---|
| | | Method | Remote |
| | | KEY-c | VAL-c |
| KEY | | | |
| KEY | → | KEY-a | VAL-a |
| | | KEY-b | VAL-b |
| | | KEY-c | VAL-c |

FIG. 7J

APPARATUS, SYSTEM AND METHOD FOR MULTI-CONTEXT EVENT STREAMING NETWORK VULNERABILITY SCANNER

BACKGROUND OF THE INVENTION

Field of the Invention

The present invention relates to network security and more particularly to an apparatus, system, and method for multi-context event streaming network vulnerability scanner.

DESCRIPTION OF THE RELATED ART

Computer networks have evolved substantially over the last decade due in part to the rise of new network-centric technologies such as hardware virtualization and cloud-computing. Hardware virtualization through software packages such as VMWare' allows a single computer to host many 'virtual computers' that may (and often do) appear alongside their host computer as peer machines with their own IP addresses on the network.

The rise of cloud-computing technology has given rise to large networks of automatically configured virtual nodes that represent a much tighter integration between a single host and its peer nodes than a normal heterogeneous deployment.

One of the traditional methods for assessing the security posture of a network is to use a network vulnerability scanning tool. These tools work by sending out a set of network probes that attempt to identify all computers on the network and then discover any security vulnerabilities on them.

SUMMARY OF THE INVENTION

A method for scanning a network is presented. In some embodiments, the method includes providing a network scanner having computer memory and a network interface for sending and receiving data over a computer network. The method may also include receiving in the computer memory a scanner engine that is configured to initiate a plurality of test programs. In addition, the method may include executing the scanner engine in the network scanner and, in some embodiments, receiving in the computer memory a first test program.

In some embodiments, the method may include executing the first test program in response to a first command from the scanner engine, where the first test program sends data using the network interface to one or more devices on the network. Also, the method may include receiving data using the network interface from the one or more devices on the network in response to the data sent by the first test program. The method may include determining one or more context findings from the first test program based on the data received from the one or more devices on the network in response to the data sent by the first test program. In addition, the method may include reporting the one or more context findings from the first test program to the scanner engine while the first test program is executing.

In some embodiments, the method may also include receiving in the computer memory a second test program, and executing the second test program in response to a second command from the scanner engine, where the second command from the scanner engine is created in response to the one or more context findings from the first test program and where the execution of the second test program causes the network scanner to send data to the one or more devices on the network. The second test program may be executed before the first test program finishes executing.

In some embodiments, the method may include receiving data using the network interface from the one or more devices on the network in response to the data sent by the second test program. In addition, the method may include determining one or more context findings from the second test program based on the data received from the one or more devices on the network in response to the data sent by the second test program. Also, the method may include reporting the one or more context findings from the second test program to the scanner engine while the second test program is executing. The second test program may be executed before the first test program finishes executing.

In some embodiments, the method may include receiving in the computer memory a third test program. Additionally, the method may include executing the third test program in response to a third command from the scanner engine, where the third command from the scanner engine is created in response to the one or more context findings from the first test program and the one or more context findings from the second test program, and where the execution of the third test program causes the network scanner to send data to one or more devices on the network. The third test program may be executed before the second and/or first test programs finish executing.

In some embodiments, the method may include receiving in the computer memory a second test program. Also, the method may include executing the second test program; where the second test program sends data using the network interface to one or more devices on the network. Additionally, the method may include modifying the data sent by the second test program in response to the one or more context findings from the first test program.

In some embodiments, the method may include initiating a network scan on the network scanner from a network security operations center, where the network scan includes executing at least the first test program. In addition, the method may include sending one or more of the context findings determined from a test program to the network security operations center. Also, the method may include storing the one or more context findings in a database accessible by the network security operations center.

In some embodiments, the method may include sending a scanner release from the network security operations center to the network scanner via the interne, where the scanner release includes at least the first test program. In some embodiments, the scanner release is tailored for the network on which the first test program is executed in response to information known about the network. In some embodiments, the first test program has ordering instructions that specify the order in which the first test program attempts to determine context findings.

In some embodiments, the method may include receiving in the first test program from the scanner engine optional ordering instructions that alter the order in which the first test program attempts to determine context findings.

Tangible computer-readable media are also presented. Some embodiments include a tangible computer-readable medium comprising computer-readable code that, when executed by a computer, causes the computer to perform a method described herein.

Methods of making tangible computer-readable media are also presented. Some embodiments include a method of making a tangible computer-readable medium, the method comprising recording the computer readable medium with computer readable code that, when executed by a computer, causes the computer to perform a method described herein.

The terms "a" and "an" are defined as one or more unless this disclosure explicitly requires otherwise.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Any embodiment of any of the present apparatuses (including the tangible computer-readable media), systems, and methods can consist of or consist essentially of—rather than comprise/include/contain/have—any of the described elements and/or features. Thus, in any of the claims, the term "consisting of or "consisting essentially of can be substituted for any of the open-ended linking verbs recited above, in order to change the scope of a given claim from what it would otherwise be using the open-ended linking verb.

Other features and associated advantages will become apparent with reference to the following detailed description of specific embodiments in connection with the accompanying drawings.

BRIEF DESCRIPTION OF THE FIGURES

The following figures form part of the present specification and are included to further demonstrate certain aspects of the present invention. The invention may be better understood by reference to one or more of these figures in combination with the detailed description of specific embodiments presented below.

FIGS. 7A-7J are data structures that may be used in a scanner engine.

DETAILED DESCRIPTION

Various features and advantageous details are explained more fully with reference to the nonlimiting embodiments that are illustrated in the accompanying figures and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
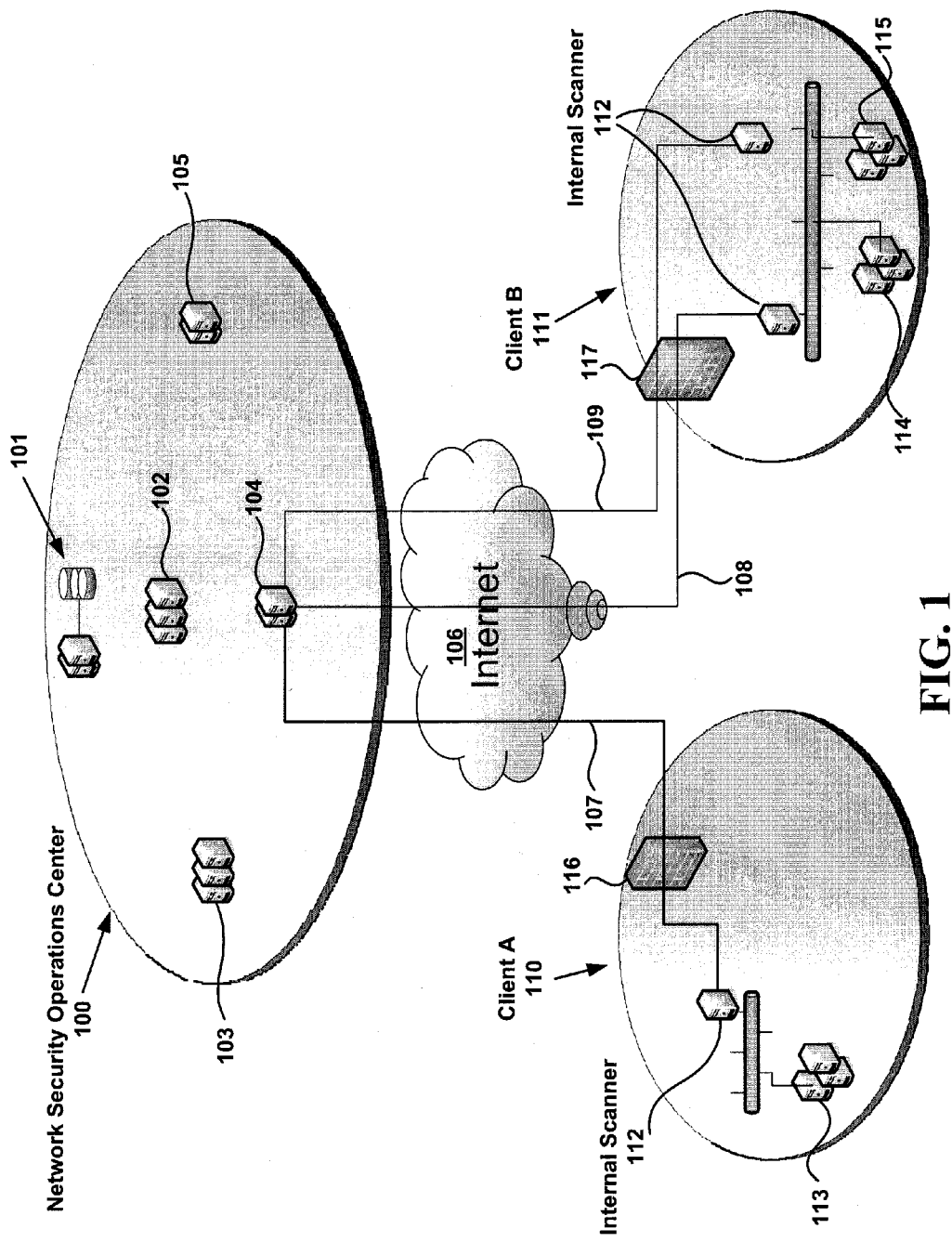
FIG. 1 is a schematic block diagram of a scanner system.

FIG. 1 illustrates a high-level view of a network implementing one embodiment of a multi-context event streaming network vulnerability scanner. The system includes a Network Security Operations Center ("NSOC") 100 and vulnerability scanners 112 located at the premises of Client A 110 and Client B 111. In some embodiments, all functionality contained within the NSOC 100 may be combined within one device and may be located within a given client premise for use solely by a given client.

In this embodiment the NSOC 100 includes a Database Complex 101, a Business Logic Complex 102, Web Complex 103, Scanner Orchestration and Message Gateway Complex 104 and also includes a bank of remote vulnerability scanners 105. The remote vulnerability scanners 105 may serve to assess a client's external security posture whereas a vulnerability scanner 112 located at a client's premises may serve to assess the client's internal security posture. Remote vulnerability scanners 105 located within the NSOC 100 may be identical to vulnerability scanners 112. Client information including vulnerability data is stored within Database Complex 101. Database Complex 101 may be a collection of computers and/or software that stores information. In some embodiments, Database Complex 101 may reside in a plurality of different locations. Business Logic Complex 102 may include a set of servers that provide a set of services to Web Complex 103 and to Scanner Orchestration and Message Gateway Complex 104. For example, Business Logic Complex 102 may access and update client vulnerability data from/to Database Complex 101. Business Logic Complex 102 may also serve as a gatekeeper for the Database Complex and a control center for scanners 112 and 105.

Web Complex 103 includes a web server that serves up web pages over a portal. It may also be used to render various vulnerability assessment and vulnerability management reports. Web Complex 103 may allow client users to schedule their vulnerability assessments, view and manage their results remotely over the interne 106, and obtain scan reports. Web Complex 103 may call services from Business Logic Complex 102 to obtain the data required to create reports requested by a client user over the portal. Scanner Orchestrator and Message Gateway Complex 104 performs at least two functions. First, it may act as an orchestrator for scanner activities such as initiating a scan launch when given scan schedules arrive from the Business Logic Complex. Second, it launches scans on scanners both for external and internal assessments as well as reporting scan results to the Business Logic Complex 102. In addition, Scanner Orchestrator and Message Gateway Complex 104 may serve as a secure message gateway for at least some of the scanners located both within NSOC 100 and at client premise locations 110 and 111.

In this embodiment, scanners 112 initiate secure connections 107, 108, and 109 to Scanner Orchestrator and Message Gateway Complex 104. A secure connection may help ensure the confidentiality of messages sent to and from the scanners. In some embodiments, the secure connection is achieved using SSH or SSL. External scanners 105 may send traffic to client internet-facing devices for the purpose of performing external vulnerability assessments. Internal scanners 112 may actively send packets to network-connected devices 113, 114, and 115 that they are scanning for the purpose of performing internal vulnerability assessments. The results discovered via these assessments may be sent over the secure channel (e.g., 107, 108, or 109) to Scanner Orchestrator and Message Gateway Complex 104, where they are written into Database Complex 101 by calling services in Business Logic Complex 102. In FIG. 1, Client A 110 and Client B 111 have firewalls 116 and 117, respectively. Scanners 112 are located behind firewalls 116 and 117, which allow them to conduct internal vulnerability scans. By contrast, scanner 105 is located outside firewalls 116, and 117, and is only able to conduct an external vulnerability scan.

Although the embodiment of the NSOC 100 described in FIG. 1 is shown as having different components that perform different functions, the system may be implemented in as little as one computer that implements one or more of the described functions.

NSOC to Scanner Interaction

Figure 2:
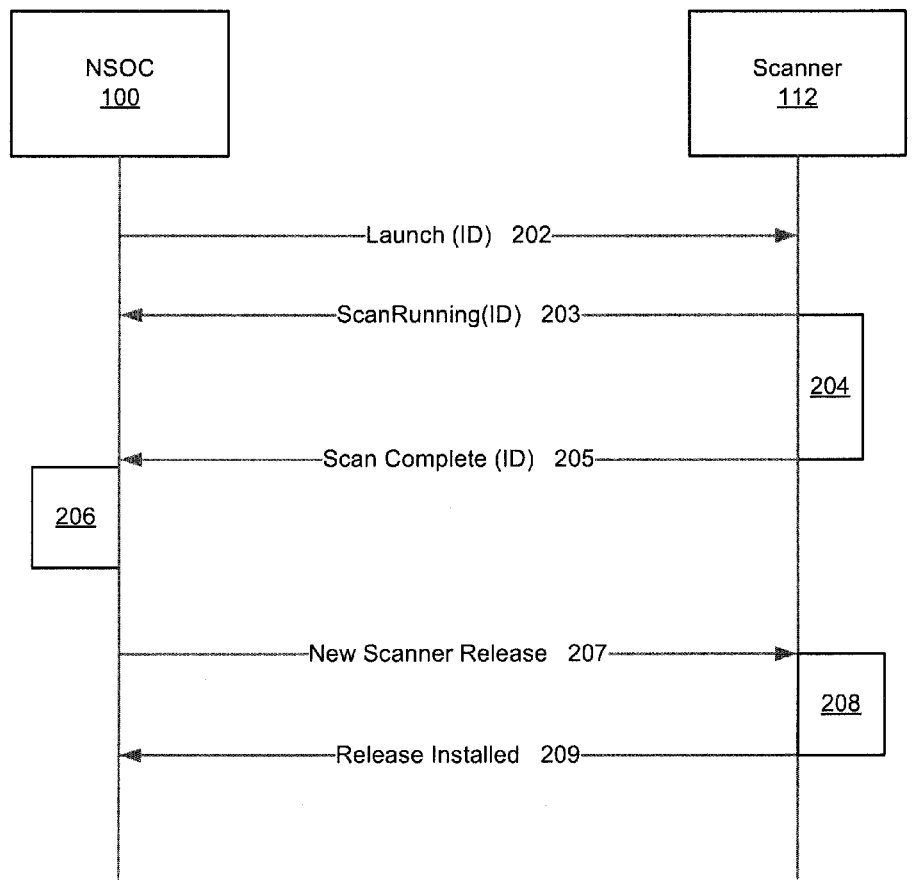
FIG. 2 is a process flow diagram showing the interaction between a network security operations center and a network scanner.

FIG. 2 illustrates the interaction between NSOC 100 and a scanner 112. The figure illustrates the activities that occur at the point in time where NSOC 100 has determined that it is time to launch a scan on a given scanner. At that time, a Launch message 202 is sent to the scanner 112. Message 202 contains information that the scan requires to launch such as, for example, an identifier ID, IP address ranges, or configuration information such as scan speed setting. The scanner 112 replies to NSOC 100 to signal that it has received the message with a ScanRunning message 203 that includes the identifier ID that, for example, was previously sent within the launch message. In some embodiments, this allows NSOC 100 to set the state of the scan into a running state within NSOC 100 database for the given scan launch that was requested. The scanner 112 proceeds to run the scan 204. In some embodiments, a scan includes a plurality of test programs. When the scan completes, the scanner 112 sends the results back to NSOC 100 within a Scan Complete message 205, which may contain the scan identifier ID as well as the scan results 206. NSOC 100 then inserts scan results 206 into Database Complex 101.

As new threats are discovered or as scanning techniques advance, the disclosed system may support the ability to add and update the test programs that detect vulnerabilities. To achieve this, test programs may be packaged into a scanner release file and deposited into Scanner Orchestrator and Message Gateway Complex 104 within NSOC 100. A process within this complex sends the new release to the scanners in the form of a New Scanner Release 207 message. When the scanner receives this, it installs the new test programs on its disk 208 where they will then be available to execute. The scanner 112 may then send a Release Installed message 209 indicating that the scanner 112 has the new release of test programs.

Scanner Software Layering

Figure 3:
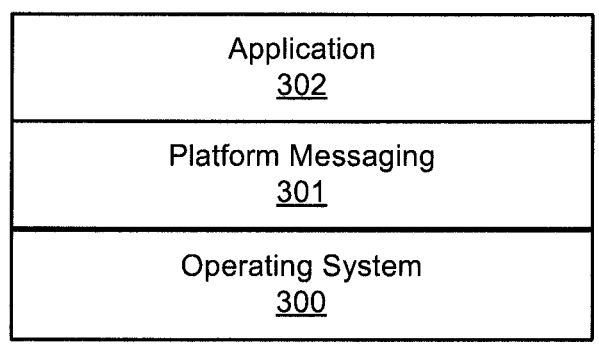
FIG. 3 is a schematic block diagram showing network layers of a network scanner node.

FIG. 3 illustrates the high level software architecture of one embodiment of a scanner 112. The scanner 112 hardware may include an off the shelf computer in the form of a small desktop or in the form of a rack-mount computer with one or more CPUs, random access memory, hard disk storage, a network interface that allows the computer to send and receive data over a computer network, and an optional monitor and keyboard (or other data input device). Internally, the scanner 112 may include a software stack that includes an Operating System 300, a Platform Messaging software layer 301, and an Application layer 302. Examples of the Operating System 300 include Microsoft Windows, such as Windows Server 2008, and Linux, such as SuSe Linux. Platform Messaging layer 301 is responsible for establishing a secure connection to NSOC 100 and is the conduit for all NSOC 100 to scanner 112 messages. Application layer 302 is responsible for executing the vulnerability assessment software, which includes at least one vulnerability assessment engine and vulnerability assessment test programs.

Scanner Software Architecture

Figure 4:
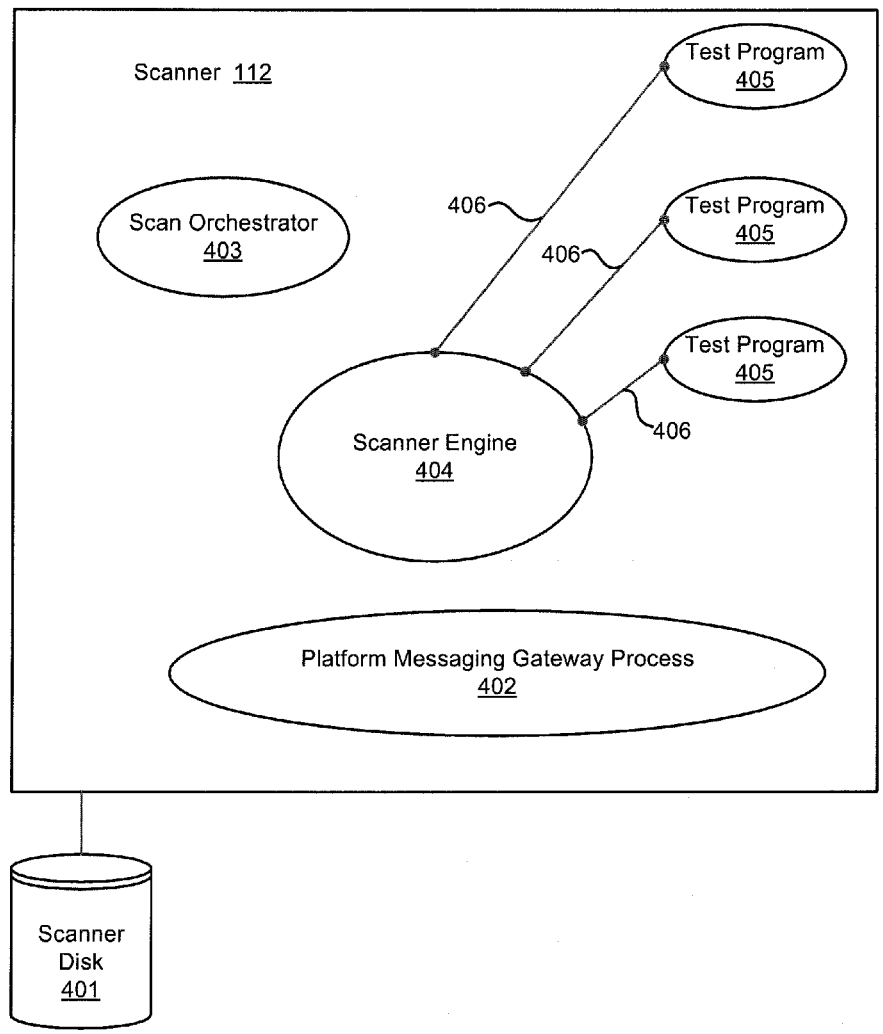
FIG. 4 is a schematic block diagram of a network scanner.

FIG. 4 illustrates greater functional detail of a scanner 112. The Platform Messaging Gateway Process 402 runs in Platform Messaging layer 301. It establishes the secure connection to NSOC 100 upon scanner device boot up. Messages arriving to the scanner 112 from NSOC 100 may be directed to the Scan Orchestrator process 403. For example, scan Launch messages 202 are delivered to this process. Scan Orchestrator 403 starts an independent Scanner Engine process 404. Although only one Scanner Engine process 404 is shown, in some embodiments multiple Scanner Engine processes 404 may be simultaneously run on a scanner 112. Scanner Engine process 404 is responsible for determining which tests programs 405 to run and launching those test programs by initiating one or more commands. When a test program launches, it establishes a local communication path 406 to Scanner Engine 404 for the purpose of sharing discovered information, such as in real time. For example, test program 405 may share discovered information with Scanner Engine 404 before test program 405 is finished executing. Although Scan Orchestrator 403, Scanner Engine 404, Platform Messaging Gateway Process 402 and test programs 405 are shown as separate functions in FIG. 4, they may each represent a portion of a program, or a subroutine, running on a single computer.

Test programs 405 send network packets to the targets (e.g., networked devices 113, 114, or 115) they are assessing and receive responses from the targets. These packets generally take the form of TCP/IP, ICMP and/or UDP datagrams. A given test program 405 may discover many independent findings. For example, a Portscan Test may discover many open ports on a given IP address for a given device. In this example, each open port is considered an independent finding within the context of the given host IP address that the Portscan Test discovers. As such, each individual set of information that is discovered from the network devices may be considered a context finding. As test program 405 is running, each context finding may be communicated to Scanner Engine 404 in real-time as the information is discovered. Scanner Engine 404 then may modify its behavior in response to the context findings as they arrive—the test need not finish before context findings are sent to the Scanner Engine 404. When a scan completes, Scanner Engine 404 packages the results into an output file that it stores on the Scanner Disk 401. Scanner Engine 404 then signals Platform Messaging Gateway Process 402 to send the results to NSOC 100 across the established secure channel (e.g., 107, 108, or 109) where the Scan Orchestrator and Message Gateway 104 receive them and call services upon Business Logic Complex 102 in order to insert those results into NSOC Database Complex 101.

Scanner Test and Engine Interaction

Figure 5:
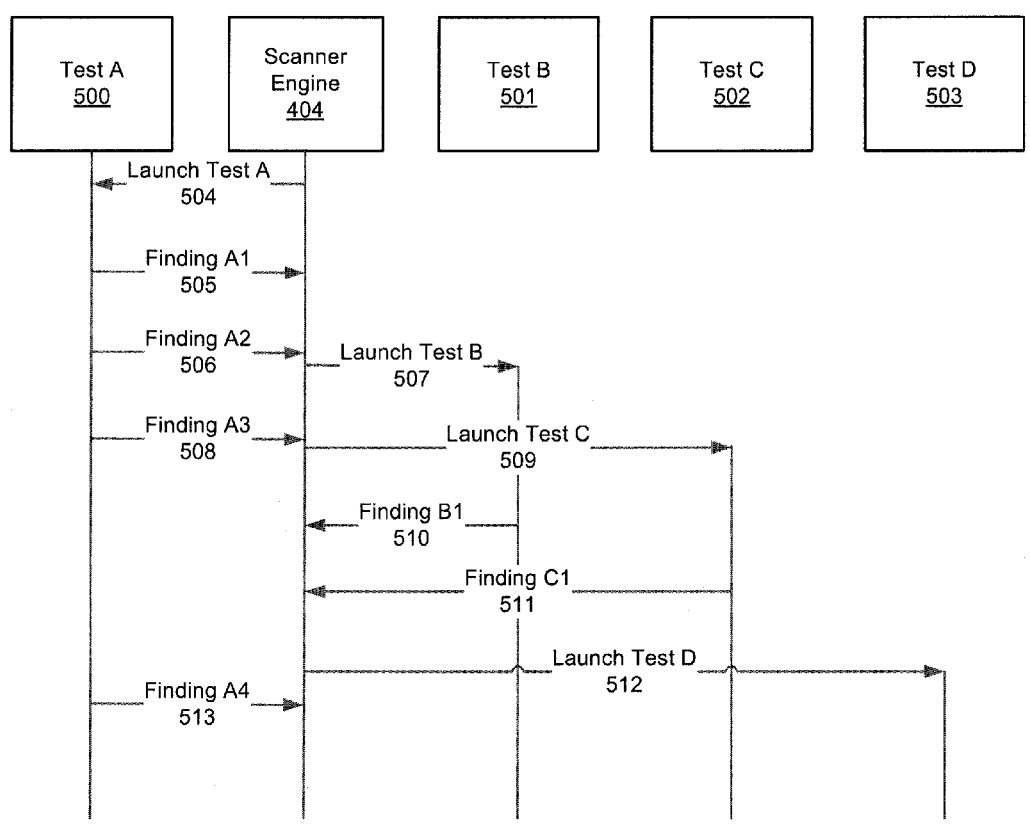
FIG. 5 is a process flow diagram showing the interaction between a scanner engine and a plurality of test programs.

FIG. 5 illustrates the interaction between Scanner Engine 404 and test programs 500, 501, 502 and 503. This figure illustrates that the test programs identify findings as they are running. For example, Scanner Engine 404 launches test program A 500 by sending the Launch Test A command 504. As test program A 500 executes and discovers context findings, test program A sends those context findings, such as Finding A1 505, to Scanner Engine 404. Upon each discovered context finding, the context finding is shared with Scanner Engine 404. In some embodiments, each context finding results in a message being sent to Scanner Engine 404. The Scanner Engine processes the context findings as they arrive and may determine a new test to launch at that given point in time. For example, Scanner Engine 404 may determine that it should launch test program B 501 and send a command 507 after having received Finding A2 506 from test program A 500. By launching a second test program based on information gathered from a first test program before the first test program has finished executing, the system may be able to decrease the time required to run a complete scan. As shown, test program A 500 continues to find and report context Finding A3 508 and Finding A4 513 after test program B 501 is launched. In addition, the system may be able to better tailor a scan by running test programs in response to information gathered from other test programs.

FIG. 5 also shows how additional test programs C 502 and D 503 may be launched by Scanner Engine 404 and how the test programs may be launched in response to context findings from one or more test programs. For example, Scanner Engine 404 launches test program C 502 after having received three findings (505, 506, and 508) from test program A 500. Also, Scanner Engine 404 launches test program D 503 by issuing command 512 after having received Findings A1 505, A2 506, A3 508, B1 510, and C1 511. Therefore, the decision to launch test program D may be based on context findings reported from test programs A 500, B 510, and/or C 502. The result may be a scan that adapts to the information gathered as it is gathered, thereby resulting in a faster and better tailored vulnerability scan.

Context Levels and Context Findings

In some embodiments of the scanner 112, the scanner 112 is capable of storing any type information that has been discovered. The information tracked by the scanner 112 may be classified as falling within five levels called contexts levels. In this embodiment, these contexts levels are: 1) Scan context, 2) Host context, 3) Service context, 4) Application context, and 5) Vulnerability context. The Scan context is the root level context in that it has no parent context. The other four contexts exist within their parent context level. The scan context of a particular context finding may be an identification of a particular scan. For example, the scan context of a context finding may identify the date and manner that a particular network is scanned.

The different context levels represent a hierarchical description of a particular context finding. The Host context exists within the Scan context. The Service context exists within the Host context. The Application context exists within the Service context, and the Vulnerability context exists within its parent Application context. The information contained within each context level is described in more detail below.

Each context level contains a uniqueness identifier that distinguishes a context finding at that context level from another context finding at the same level. However, there is only one possible context finding at the Scan context level and, as such, it has no uniqueness identifier. There are many possible context findings at the Host context level 600, and these may be distinguished from each other at that level by their IP address. For example, a host context finding for 192.168.60.2 is distinguished from 192.168.60.3 at the Host context level because of the different IP addresses. The Service level context 601 uniqueness may be made up of the port and the protocol (e.g. 80-TCP), for example. Each independent piece of information that the scan discovers is referred to as a context finding. A given context finding may be unique by the uniqueness of each of the context levels that applies to it. For example, a vulnerability finding is fully qualified by expressing the unique IDs for the Scan Context, the Host context, the Service Context, the Application context and the Vulnerability context. This context finding's fully qualified context may resemble the following string: "Host: 192.168.60.2:Service:80:TCP:Application:HTTP:Vulnerability:5555". That context finding may be reported to the scanner engine 404 and be used in the scan as described above.

A test program may attempt to discover a single context finding or many context findings. For example, the Host Discovery Test attempts to discover all hosts within the IP ranges that it is given. As such, it attempts to discover many context findings—one for each IP within the requested scan ranges.

In some embodiments, all test programs used in the system are designed from the ground up so as to share their context findings with the Scanner Engine 404 over a local communication path as soon as a given context finding is discovered. To ease the implementation burden of sharing context findings with the Scanner Engine 404 as they are discovered, tests programs are implemented using a set of application programmer interfaces (API). Test implementers may use the API to "set" context findings. For example, in order to set a vulnerability context finding, an implementer may call a set-Vuln( )API function call, and in doing so, pass in the appropriate context uniqueness and finding information. The API function, as called within the given test program, internally collects this information and shares the context finding in real time with Scanner Engine 404. The establishment of a local communication path to the scanner engine may be encompassed within the underlying functionality of the API.

Typically, test programs are designed to discover context findings at the same context level. However, embodiments of the present API may be flexible and allow one to set a context finding within any context level. A running test program may therefore set a context finding at one context level and, within the same test program instance run, set other context findings at a different context level. This concept is referred to as a cross-context finding. Cross-context findings are useful in identifying findings for many modern networks. One example where cross-context findings are useful is within virtualized host environments. For example, a test program may discover vulnerability-related context findings while it is testing within a context for a given host, service, and application. During that same test program, it may discover data for a different virtualized host (with a different IP address than the original context). In this situation, the test program may set context findings within the context of the virtualized host even though it had not sent any packets to that host. Cross-context findings allow the scanner to discover findings for a given context (e.g., host) that would not otherwise be possible and therefore provides a greater level of discovery for security-related issues.

Test programs may be designed in any programming language, such as C++or Perl. In general, test programs send packets to the devices that they are auditing, receive responses, draw conclusions based on the responses, and share context findings with Scanner Engine 404 while the test program is still running. This event discovery "streaming" method results in a fast scan completion. It also provides the ability to draw conclusions on context findings that it is not auditing. For example, the system may set context information for a device that it is not currently testing from a context finding it has discovered from a related device.

A given test program need not always launch because the context information that it attempts to discover may never exist due to the landscape of what has been previously discovered for a given scan. For example, many vulnerabilities are only applicable to Windows operating systems. It therefore would be inefficient to attempt to test for Windows-unique vulnerabilities if the given host's operating system has been identified as Linux by a previously-executed test program. These dependencies are specified within the test program's program code using a test program API. Each new scanner release comes with a test-dependency file that specifies the context-dependent information that each test program depends upon. In some embodiments, during a new scan release, a tool may be executed versus the entire suite of test programs (or at least some of them), and it extracts the dependency specification for each test program against which it was executed and places the information into a meta-test release file. This file is then distributed to all scanners as part of a scanner release update over the secure channel between the scanners and NSOC 100, as described above in relation to FIG. 2. It is then used by the Scanner Engine 404 process during a scan run in its determination of what test programs to launch in response to information that has been received.

Scanner Database Schema

Figure 6:
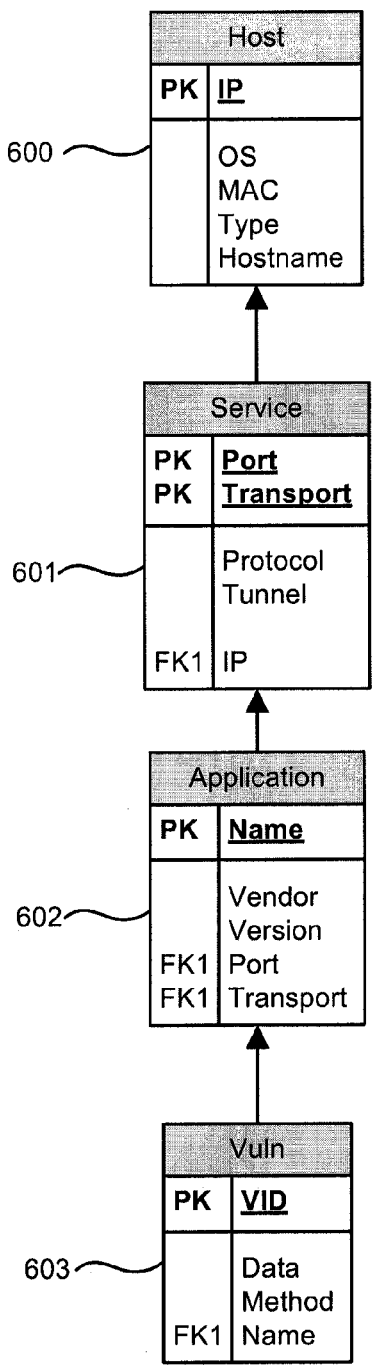
FIG. 6 is an entity-relationship diagram of a context finding.

FIG. 6 is an entity relationship diagram that illustrates the scanner relational database schema. The database schema includes information for all context levels with the exception of the Scan context because, in some embodiments, that context does not include any information that is relevant to a particular device and is only used while the scan is running. The database schema includes four tables that map directly to the other four context levels. First is the Host table 600 that relates to the Host context and that stores host-related information such as IP address, Operating System and other host-related information. Second is the Service table 601 that relates to the Service context and that stores service-related information such as the discovered open ports for a given host. Third is the Application table 602 that relates to the Application context and that stores application related information such as the application name and vendor name. Fourth is the Vuln (vulnerability) table 603 that relates to the Vulnerability context and that stores vulnerability-related information.

In some embodiments, the SQLite database management system is used to store the data tables in memory within Scanner Engine 404. In some embodiments, any RDBMS product may be used and the data may be stored on scanner device hardware, such as a hard drive.

As a scan runs, Scanner Engine 404 receives context findings from the various running test programs. It stores the context findings in various data structures as well as within the four described data tables. When the scan completes, Scanner Engine 404 reads data that is stored within these four data tables and serializes the data into an output file. In some embodiments, the scan output file consists of an XML data structure on a disk. Once the file has been serialized, Scanner Engine 404 signals Platform Messaging Gateway 402 to send the results to NSOC 100.

Scanner Data Structures

FIGS. 7A-7J illustrate the various internal data structures that may be used by Scanner Engine 404. The Test Ready Queue 700 shown in FIG. 7A tracks the test programs that are ready to launch (e.g., T3) and upon which context findings (e.g., C1) to launch. Scanner Engine 404 determines the test programs that are ready to execute based on previously-discovered context findings, as described above. The Test Run List 701 shown in FIG. 7B tracks the test programs that are currently running. It is a data structure that includes a number of entries that may be predetermined by the scan speed setting. The scan speed may be specified at scan launch time as a parameter to Scan Orchestrator 403 for the given scan. Faster scan speed settings correlate to a greater number of entries in Test Run List 701 and as a result, more simultaneous running test programs.

The Test Context Launch Table 702, shown in FIG. 7C, tracks the test programs that have already been executed for given context findings. For example, a Web Server Application Discovery Test tests to determine the application name for a previously-discovered web server and it should execute for each web server that is discovered. These dependencies are described within the test program itself and also within the meta-test release file on the scanner disk. For example, the test program should run for each independent applicable Service discovery context for services where the discovered protocol is HTTP for each device in the scan. If there are five hosts, four of which have one web server running on them but the fifth has two web server instances, there are then six total applicable unique fully qualified contexts applicable. Test Context Launch Table 702 in this case would have six tracking entries for the given test program once the test program has executed six times (once per unique context).

Scanner Engine 404 maintains two tables that track the test program to discovery context event dependencies. These are the Event to Test Dependency Table 703 shown in FIG. 7D and the Test to Event Dependency Table 704 shown in FIG. 7E. Although the data structures and their purposes differ, the information tracked within these data structures is the same. When Scanner Engine 404 receives a new context finding from a running test program, it consults Event to Test Dependency Table 703 to determine all test programs that are candidates for launching. It then consults Test to Event Dependency Table 704 for each launch candidate test program to determine if the test program has met all of its required launch dependencies. If it has, and if the test program has not yet launched for the given context as indicated from the information within Test Context Launch Table 702 for the given test program, Scanner Engine 404 launches the test program. When the test program is launched, an entry is added to Test Run List 701 for the given test program. The received context finding is also added to the appropriate Context Level Event Completion Table 705, 706, 707, 708 or 709.

Scanner Engine 404 also keeps track of events that have been received and processed for each context finding. If it has already received an event for a given context finding, it realizes that it has already processed the event and it takes no action other than discarding the event. There is one internal data structure for each of the five context levels, as illustrated in FIGS. 7F-7J. First is the Scan Context Level Event Completion Table 705 shown in FIG. 7F. This table holds information from scan context level events. Second is the Host Context Level Event Completion Table 706 shown in FIG. 7G. This table holds the information gathered on the Host context level. Third is the Service Context Level Event Completion Table 707 shown in FIG. 7H. This table holds the information gathered from the Service context level. Fourth is the Application Context Level Event Completion Table 708 shown in FIG. 7I. It holds information gathered from the Application Context level. The Vulnerability Context Level Event Completion Table 709 shown in FIG. 7J holds information gathered from the Vulnerability Context level. When an event for a context finding is received, and if it has not already been received, Scanner Engine 404 inserts the received event within the appropriate Context Level Event Completion Table 705, 706, 707, 708 or 709.

Life of a Scan

Figure 8:
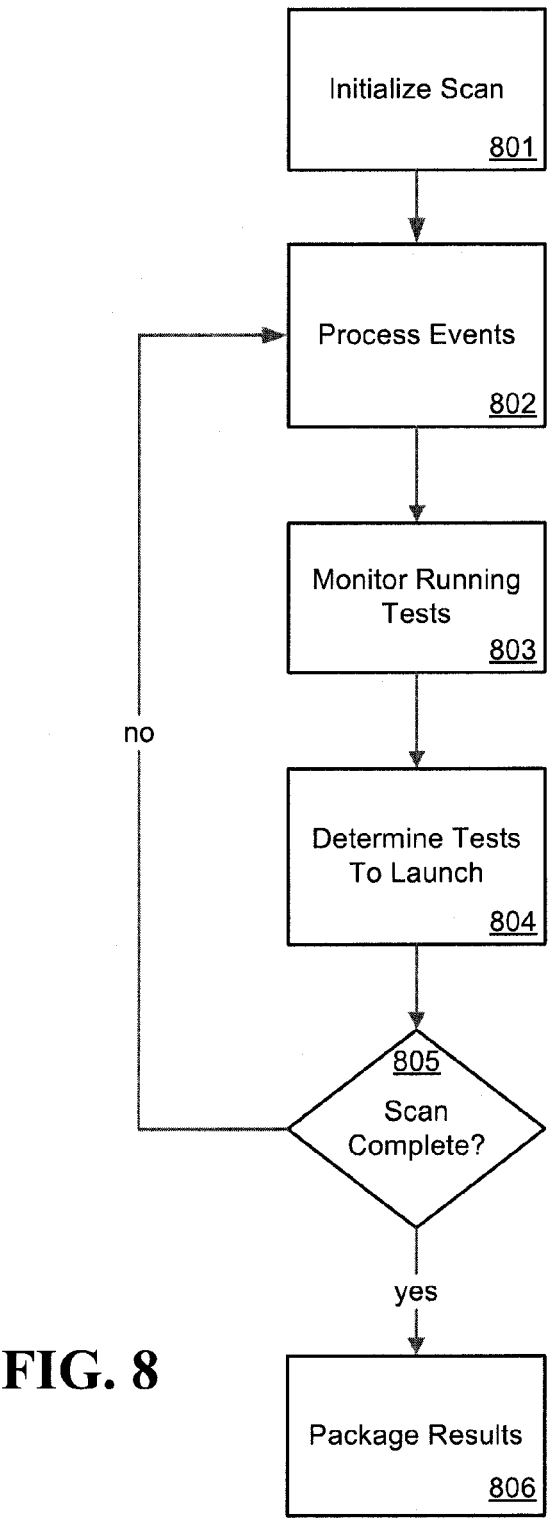
FIG. 8 is a flow chart of a scanner engine process.

FIG. 8 shows the high level flow of a scan. When the Scan Orchestrator 403 process launches a scan, it creates a Scanner Engine 404 process. This is responsible for all stages of the scan's life, including initialization 801 (FIG. 9), processing events as they arrive 802 (FIG. 10), monitoring the running tests 803 (FIG. 11A), determining when tests are ready to launch 804 (FIG. 11B), determining if the scan has completed 805, and packaging the results after the scan has completed 806 (FIG. 11C). These activities are described further with reference to FIGS. 9-11C.

Figure 9:
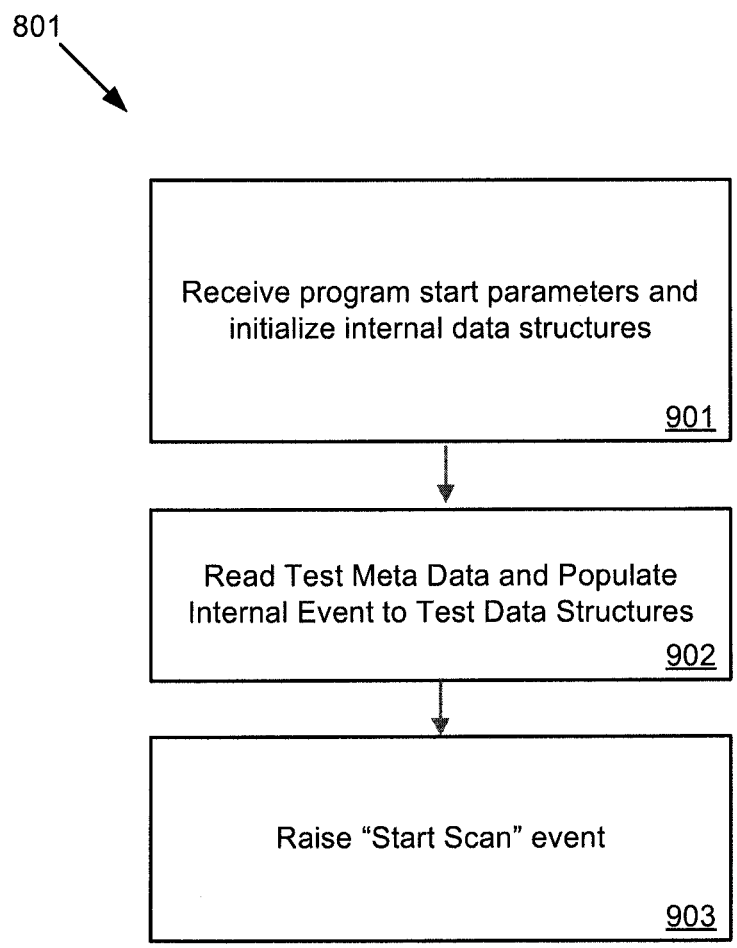
FIG. 9 is a flow chart of a scanner engine initialization.

FIG. 9 illustrates the Scanner Engine 404 initialization. In some embodiments, Scanner Engine 404 is a program that may be invoked from another program or via a command line interface. In both cases, Scanner Engine 404 receives program start parameters and initializes data structures 901. Program start parameters may include, for example, scan speed and IP address ranges. Scanner Engine 404 may use the scan speed parameter to determine the number of simultaneous running tests that it may launch, and it may initialize the Test Run List 701 accordingly. The IP ranges that are passed in as an argument are stored in the Scan context as a key-value pair. They are used by Scanner Engine 404 at the point where the Host Discovery Test is launched, for example.

Test Ready Queue 700 is initialized to a given size but may grow during a scan if needed. Test Context Launch Table 703 is initialized as empty and contains no entries for any test programs at initialization. If may grow as new test programs are launched for the first time for the first context that it tests.

Two additional pieces of information are passed as parameters to Scanner Engine 404 on program start. These are "ordering instructions" for various test programs, and "client context findings information." The ordering instructions are used to run given test programs in a particular order. The goal may be to discover particular context findings as fast as possible. For example, some internet ports, such as port 80 and port 21, may be found much more frequently than other ports, such as ports 1000 and 1001. If a test program can discover a context finding at an earlier time with particular ordering instructions than without them, it could result in an overall faster scan execution. This result may be compounded when additional test programs are run based on context findings from other test programs. For example, if a second test program is launched when port 80 is found, the second program will be launched sooner if port 80 is tested before any other port, resulting in a faster overall scan.

Ordering instructions may come in two forms—default ordering instructions and client-specific ordering instructions. Default ordering instruction may be implemented within the given applicable test program or may be sent to the Scanner Engine 404 as a parameter. For example, in some embodiments, the Port Scan Test scans more prevalent ports up front by default, as may be specified within its program code. However, Scanner Engine 404 may receive client-specific ordering instructions as an argument to Scanner Engine 404 on process startup. This allows for the information discovered during a given client's previous assessment to be used to achieve faster scan completion times.

Client context finding information may include context information that is specific to a particular client. For example, information from previous scans for a given client may be sent from NSOC 100 to the scanner 112 for the given client under assessment. This past information is used by Scanner Engine 404 to attempt to discover context findings that it might otherwise miss. For example, a previous assessment may have discovered a vulnerable administration account on a given web server. This same account information may be applicable on other hosts in the current scan even though context finding information might cause the given test program to not attempt that given account with the given credentials. In this way, Scanner Engine 404 can use previously discovered information from past scans for the same client in its attempt to identify context findings.

As part of the initialization, Scanner Engine 404 reads 902 the meta-Test release file data and populates Event to Test Dependency Table 703 and Test to Event Dependency Table 704. This information tracks the given context finding information that specifies whether or not a given test program should launch.

At the end of its initialization, Scanner Engine 404 raises a Scan context level finding by creating an entry in the RDBMS Scan table with a "Start-Scan" context finding event 903 and processes it, immediately in some embodiments. This causes the scan to start because there is always a dependency entry in the Event to Test Dependency Table 703 for this event. The test program typically associated with this event is the Host Discovery Test. Scanner Engine 404 then launches that test program and passes it the previously-stored IP address ranges. Scanner Engine 404 then adds an entry to Test Run List 701 for the given Host Discovery Test. It then enters a processing loop labeled as Process Events 802 described in connection with FIG. 10.

Figure 10:
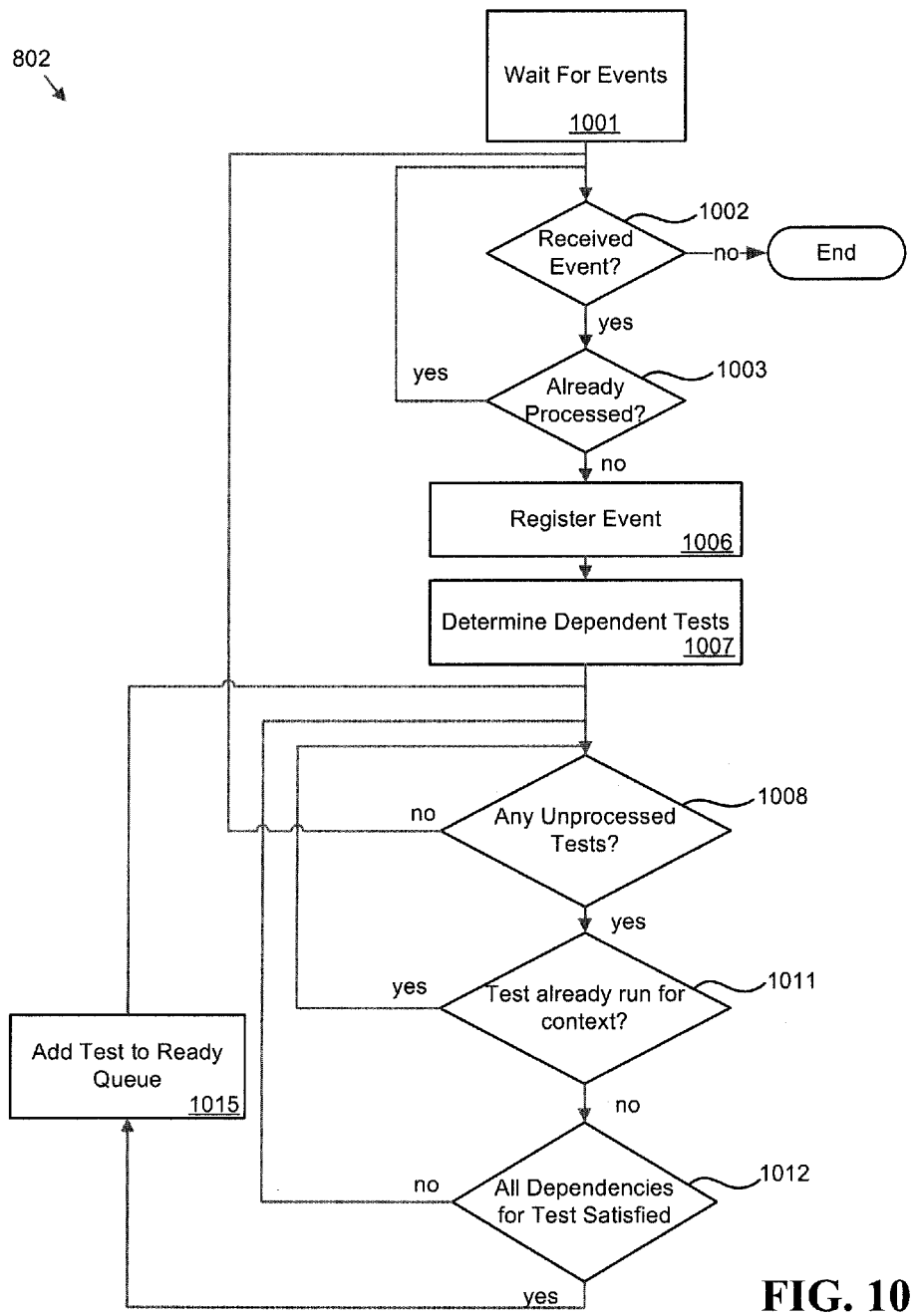
FIG. 10 is a flow chart of a scanner engine process.

FIG. 10 illustrates the activities that Scanner Engine 404 performs upon receiving an event. Once initialization is complete, Scanner Engine 404 enters a state in which it waits for an event 1001. Sometimes, all test programs are busy for an extended period of time. Scanner Engine 404 may be programmed to send a wakeup event (e.g., a short timer) to itself in the event of a malfunction in order for Scanner Engine 404 to maintain control of the process in the event where a malfunction would cause no events to occur. If no event is received, Scanner Engine 404 re-enters its idle waiting state to process events 802. When an event is received 1002 from a test program or when the Scanner Engine 404 timer event is received, Scanner Engine 404 wakes up and processes the event. It first determines if it had already processed the event for the given context finding 1003. It does so by consulting one of the Context Level Event Completion Tables 705, 706, 707, 708 or 709 for the given context finding. If it had already processed the event for the given context, it moves on to reading its event queue 1002 to determine if any new events were received. If it has not previously processed the event for the given context finding, then Scanner Engine 404 registers the event 1006 in the appropriate Context Level Event Completion Table and stores the context finding in the appropriate RDBMS table for the given context level 600, 601, 602 or 603.

The Scanner Engine 404 next determines the test programs that are dependent upon the received event 1007. It does so by consulting Event to Test Dependency Table 703 for the given context finding received in the event. Scanner Engine 404 then examines each test program identified in a loop. FIG. 10 shows the loop control at the beginning of the loop in the "Any Unprocessed Test" control element 1008. If there are no more unprocessed test programs, the loop is completed and control passes along the "no" path back to reading its event queue 1002. For each unprocessed test program, control passes along the "yes" path. Scanner Engine 404 then determines if it has already launched the given test program 1011 for the current loop pass for the given context finding. If it has, there is no reason to launch it again because it would only discover information that had already been discovered. In this case, the "yes" path is taken and control returns to 1008 to examine the next test program. If Scanner Engine 404 has not already launched the given test program, Scanner Engine 404 then determines if all dependencies for the given test program have been satisfied. This is shown in FIG. 10 within the control statement "All Dependencies for Test Satisfied" 1012. It does so by consulting Test to Event Dependency Table 704. If the test program cannot launch because not all of its dependencies were satisfied, control passes along the "no" path back to 1008 to examine the next test program. If all dependencies were met, control passes along the "yes" path and, in this case, Scanner Engine 404 begins the process of launching the test program by adding it to Test Ready Queue 700 as seen in process step 1015. Once the test program has been added to the Test Ready Queue, control returns back to examining the next Test 1008 identified as dependent upon the received event.

Figure 11A:
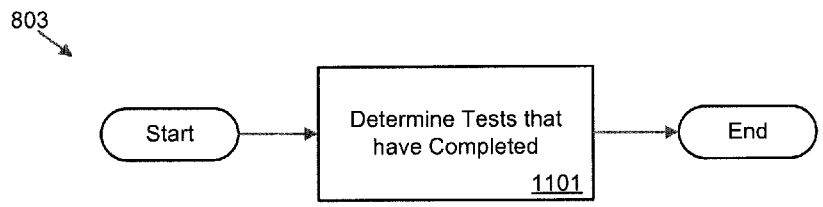
FIGS. 11A-11C are flow charts of a scanner engine process.

FIG. 11A illustrates the Scanner Engine 404 activities for monitoring currently-running test programs. After having processed received events, there may be test programs in the Test Ready Queue that are ready to launch. At any point in time, test programs might be running and might have completed. Scanner Engine 404 must therefore remove any completed test programs from the Test Run List in order to make room to launch test programs that are ready. It does this by determining test programs that have completed 1101. To do so within some embodiments, the Scanner Engine 404 tracks the process IDs for the running test programs within the Test Run List. It then sends signals to the operating system for each process to determine whether they are still running. For any that have completed, their entries are removed from the Test Run List.

Figure 11B:
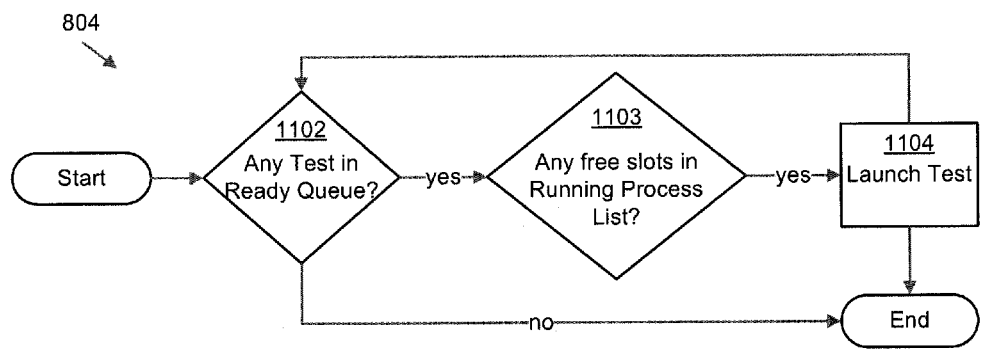
Figure 11C:
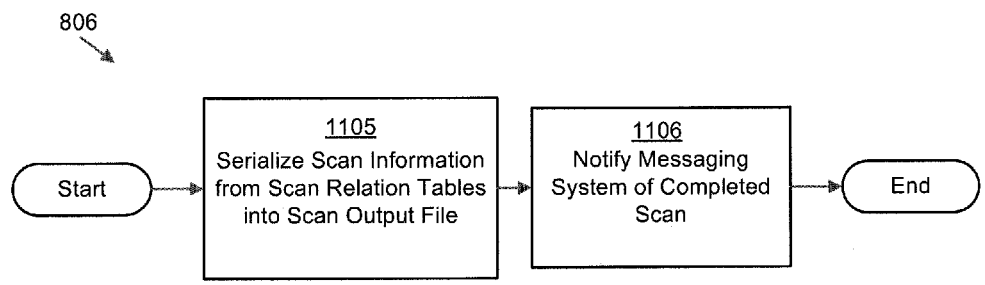

FIG. 11B illustrates the Scanner Engine 404 activities for determining if any test programs can be launched and, if so, launching them. Scanner Engine 404 determines if it can launch test programs by first examining Test Ready Queue 700 to see if there are any test programs that are ready to launch 1102. If there are, it then determines 1103 if there are any free slots within the Test Run List. If there are, Scanner Engine 404 removes the Test Entry from Test Ready Queue 700 and adds an entry to Test Run List 701. It then launches 1104 the given test program. It also adds an entry to Test Context Launch Table 702 for the given test program for the given context finding. If there is no test program in the Test Ready Queue or there are no free slots in the Test Run List, then Scanner Engine 404 determines if the scan has completed 805. It does so by consulting Test Ready Queue 700 and Test Run List 701, and by reading the local communication channels 406 associated with possible running test programs to determine if there are any available events. If there is nothing in the Test Ready Queue and no test program presently running (Test Run List empty) and no pending events, Scanner Engine 404 deems the scan to have completed and control passes to packaging the results 806 (FIG. 11C). If the scan is not deemed complete, control passes back to the point where Scanner Engine 404 is idle and waiting for events 802.

FIG. 11C illustrates the Scanner Engine 404 activities for packaging a completed scan. Once the Scan completes, the Scanner Engine 404 reads all results from the RDBMS tables and serializes the results into an output file on disk 1105. In a preferred embodiment, the results are stored in an XML format. Scanner Engine 404 then signals the Platform Messaging Gateway to send the results to the NSOC 1106.

Some embodiments include a tangible computer-readable medium that includes computer-readable code that, when executed by a computer, causes a computer to perform at least one embodiment of the present methods. The tangible computer-readable medium may be, for example, a CD-ROM, a DVD-ROM, a flash drive, a hard drive or any other physical storage device.

In some methods, a tangible computer-readable medium is created. In some embodiments, the method may include recording the computer readable medium with computer readable code that, when executed by a computer, causes the computer to perform at least one embodiment of the present methods. Recording the computer readable medium may include, for example, burning data onto a CD-ROM or a DVD-ROM, or otherwise populating a physical storage device with the data.

All of the methods disclosed and claimed herein can be made and executed without undue experimentation in light of the present disclosure. While the apparatus, systems, and methods of this invention have been described in terms of preferred embodiments, it will be apparent to those of skill in the art that variations may be applied to the methods and in the steps or in the sequence of steps of the method described herein without departing from the concept, spirit and scope of the invention. For example, a context finding may refer to a particular vulnerability; however, a context finding may also refer to more generic of information such as a host IP address. In addition, modifications may be made to the disclosed apparatuses, systems, and methods and components may be eliminated or substituted for the components described herein where the same or similar results would be achieved. All such similar substitutes and modifications apparent to those skilled in the art are deemed to be within the scope of the invention as defined by the appended claims.

The claims are not intended to include, and should not be interpreted to include, means-plus- or step-plus-function limitations, unless such a limitation is explicitly recited in a given claim using the phrase(s) "means for" or "step for," respectively.

What is claimed is:
1. A method for scanning a network comprising:
providing a network scanner having computer memory and a network interface for sending and receiving data over a computer network;
receiving in the computer memory a scanner engine, where the scanner engine is configured to initiate a plurality of test programs;
executing the scanner engine in the network scanner;
receiving in the computer memory a first test program;
executing the first test program in response to a first command from the scanner engine, where the first test program sends one or more queries using the network interface to one or more devices on the network, where the one or more devices on the network do not contain code or debug operators provided by the network scanner;

receiving data using the network interface from the one or more devices on the network in response to the one or more queries sent by the first test program;

determining one or more context findings from the first test program based on the data received from the one or more devices on the network in response to the one or more queries sent by the first test program;

reporting the one or more context findings from the first test program to the scanner engine while the first test program is executing;

receiving in the computer memory a second test program; and executing the second test program in response to a second command from the scanner engine, where the second command from the scanner engine is created in response to the one or more context findings from the first test program and where the execution of the second test program causes the network scanner to send one or more queries to the one or more devices on the network while the first test program is executing.

2. The method of claim 1, further comprising:

receiving data using the network interface from the one or more devices on the network in response to the one or more queries sent by the second test program;

determining one or more context findings from the second test program based on the data received from the one or more devices on the network in response to the one or more queries sent by the second test program; and reporting the one or more context findings from the second test program to the scanner engine while the second test program is executing.

3. The method of claim 2, further comprising:

receiving in the computer memory a third test program; and executing the third test program in response to a third command from the scanner engine, where the third command from the scanner engine is created in response to the one or more context findings from the first test program and the one or more context findings from the second test program, and where the execution of the third test program causes the network scanner to send one or more queries to one or more devices on the network.

4. The method of claim 1, further comprising:

modifying the one or more queries sent by the second test program in response to the one or more context findings from the first test program.

5. The method of claim 1, further comprising:

initiating a network scan on the network scanner from a network security operations center, where the network scan includes executing at least the first test program.

6. The method of claim 5, further comprising:

sending one or more of the context findings determined from a test program to the network security operations center; and storing the one or more context findings in a database accessible by the network security operations center.

7. The method of claim 6, further comprising:

sending a scanner release from the network security operations center to the network scanner via the interne, where the scanner release includes at least the first test program.

8. The method of claim 7, where the scanner release is tailored for the network on which the first test program is executed in response to information known about the network.

9. The method of claim 1, where the first test program has ordering instructions that specify the order in which the first test program attempts to determine context findings.

10. The method of claim 9, further comprising:

receiving in the first test program from the scanner engine optional ordering instructions that alter the order in which the first test program attempts to determine context findings.

11. A tangible non-transitory computer-readable medium comprising computer-readable code that, when executed by a computer, causes the computer to perform operations comprising:

providing a network scanner having computer memory and a network interface for sending and receiving data over a computer network;

receiving in the computer memory a scanner engine, where the scanner engine is configured to initiate a plurality of test programs;

executing the scanner engine in the network scanner;

receiving in the computer memory a first test program;

executing the first test program in response to a first command from the scanner engine, where the first test program sends one or more queries using the network interface to one or more devices on the network, where the one or more devices on the network do not contain code or debug operators provided by the network scanner;

receiving data using the network interface from the one or more devices on the network in response to the one or more queries sent by the first test program;

determining one or more context findings from the first test program based on the data received from the one or more devices on the network in response to the one or more queries sent by the first test program;

reporting the one or more context findings from the first test program to the scanner engine while the first test program is executing;

receiving in the computer memory a second test program; and executing the second test program in response to a second command from the scanner engine, where the second command from the scanner engine is created in response to the one or more context findings from the first test program and where the execution of the second test program causes the network scanner to send one or more queries to the one or more devices on the network while the first test program is executing.

12. The tangible non-transitory computer-readable medium of claim 11, further comprising computer-readable code that, when executed by a computer, causes the computer to perform operations comprising:

receiving data using the network interface from the one or more devices on the network in response to the one or more queries sent by the second test program;

determining one or more context findings from the second test program based on the data received from the one or more devices on the network in response to the one or more queries sent by the second test program; and reporting the one or more context findings from the second test program to the scanner engine while the second test program is executing.

13. The tangible non-transitory computer-readable medium of claim 12, further comprising computer-readable code that, when executed by a computer, causes the computer to perform operations comprising:

receiving in the computer memory a third test program; and executing the third test program in response to a third command from the scanner engine, where the third command from the scanner engine is created in response to the one or more context findings from the first test program and the one or more context findings from the second test program, and where the execution of the third test program causes the network scanner to send one or more queries to the one or more devices on the network.

14. The tangible non-transitory computer-readable medium of claim 11, further comprising computer-readable code that, when executed by a computer, causes the computer to perform operations comprising:
modifying the one or more queries sent by the second test program in response to the one or more context findings from the first test program.

15. The tangible non-transitory computer-readable medium of claim 11, further comprising computer-readable code that, when executed by a computer, causes the computer to perform operations comprising:
initiating a network scan on the network scanner from a network security operations center, where the network scan includes executing at least the first test program.

16. The tangible non-transitory computer-readable medium of claim 15, further comprising computer-readable code that, when executed by a computer, causes the computer to perform operations comprising:
sending one or more of the context findings determined from a test program to the network security operations center; and
storing the one or more context findings in a database accessible by the network security operations center.

17. The tangible non-transitory computer-readable medium of claim 16, further comprising computer-readable code that, when executed by a computer, causes the computer to perform operations comprising:
sending a scanner release from the network security operations center to the network scanner via the interne, where the scanner release includes at least the first test program.

18. The tangible non-transitory computer-readable medium of claim 17, where the scanner release is tailored for the network on which the first test program is executed in response to information known about the network.

19. The tangible non-transitory computer-readable medium of claim 11, where the first test program has ordering instructions that specify the order in which the first test program attempts to determine context findings.

20. The tangible non-transitory computer-readable medium of claim 19, further comprising computer-readable code that, when executed by a computer, causes the computer to perform operations comprising:
receiving in the first test program from the scanner engine optional ordering instructions that alter the order in which the first test program attempts to determine context findings.

21. A method of making a tangible computer-readable medium, the method comprising:
recording the computer readable medium with computer readable code that, when executed by a computer, causes the computer to perform operations comprising:
providing a network scanner having computer memory and a network interface for sending and receiving data over a computer network;
receiving in the computer memory a scanner engine, where the scanner engine is configured to initiate a plurality of test programs;
executing the scanner engine in the network scanner;
receiving in the computer memory a first test program;
executing the first test program in response to a first command from the scanner engine, where the first test program sends one or more queries using the network interface to one or more devices on the network, where the one or more devices on the network do not contain code or debug operators provided by the network scanner;
receiving data using the network interface from the one or more devices on the network in response to the one or more queries sent by the first test program;
determining one or more context findings from the first test program based on the data received from the one or more devices on the network in response to the one or more queries sent by the first test program;
reporting the one or more context findings from the first test program to the scanner engine while the first test program is executing;
receiving in the computer memory a second test program; and
executing the second test program in response to a second command from the scanner engine, where the second command from the scanner engine is created in response to the one or more context findings from the first test program and where the execution of the second test program causes the network scanner to send one or more queries to the one or more devices on the network while the first test program is executing.

* * * * *